US008600967B2

(12) United States Patent
Jin et al.

(10) Patent No.: US 8,600,967 B2
(45) Date of Patent: Dec. 3, 2013

(54) AUTOMATIC ORGANIZATION OF BROWSING HISTORIES

(75) Inventors: Jing Jin, Sunnyvale, CA (US); Kevin Decker, San Jose, CA (US); Timothy Hatcher, San Jose, CA (US); Raymond Sepulveda, San Jose, CA (US); Michael Thole, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 540 days.

(21) Appl. No.: 12/699,733

(22) Filed: Feb. 3, 2010

(65) Prior Publication Data
US 2011/0191344 A1  Aug. 4, 2011

(51) Int. Cl.
*G06F 7/00* (2006.01)
*G06F 17/30* (2006.01)

(52) U.S. Cl.
USPC ............ 707/706; 707/738; 707/740; 707/758

(58) Field of Classification Search
USPC ......... 707/705, 706, 736, 737, 738, 739, 740, 707/741, 746, 752, 758, 697, 769
See application file for complete search history.

(56) References Cited

U.S. PATENT DOCUMENTS

| | | | | |
|---|---|---|---|---|
| 6,408,301 B1 * | 6/2002 | Patton et al. | ................... | 707/741 |
| 6,961,731 B2 * | 11/2005 | Holbrook | ....................... | 707/102 |
| 7,076,503 B2 * | 7/2006 | Platt et al. | ...................... | 707/103 |
| 7,266,548 B2 * | 9/2007 | Weare | ............................... | 707/3 |
| 7,296,016 B1 * | 11/2007 | Farach-Colton et al. | ......... | 707/5 |
| 7,526,728 B2 * | 4/2009 | Apparao et al. | ............. | 715/745 |
| 7,747,625 B2 * | 6/2010 | Gargi et al. | .................... | 707/737 |
| 2003/0069878 A1 * | 4/2003 | Wise | ................................. | 707/3 |
| 2005/0010860 A1 * | 1/2005 | Weiss et al. | ................. | 715/500.1 |
| 2006/0224583 A1 | 10/2006 | Fikes et al. | | |
| 2006/0224938 A1 * | 10/2006 | Fikes et al. | ..................... | 715/500 |
| 2006/0242098 A1 * | 10/2006 | Wnek | .............................. | 706/45 |
| 2007/0162298 A1 | 7/2007 | Melton et al. | | |
| 2007/0220441 A1 | 9/2007 | Melton et al. | | |
| 2008/0005699 A1 * | 1/2008 | Dvorak et al. | ................ | 715/836 |
| 2008/0114764 A1 * | 5/2008 | Choi | ................................ | 707/7 |
| 2008/0200207 A1 | 8/2008 | Donahue et al. | | |
| 2008/0228928 A1 | 9/2008 | Donelli et al. | | |
| 2008/0307343 A1 * | 12/2008 | Robert et al. | ................. | 715/765 |
| 2009/0006371 A1 | 1/2009 | Denoue et al. | | |
| 2009/0100021 A1 * | 4/2009 | Morris et al. | ..................... | 707/3 |
| 2009/0204599 A1 | 8/2009 | Morris et al. | | |

OTHER PUBLICATIONS

Higuchi, Kenji et al. "Making Links Between Goal and Tasks to Retrieve Information from Web Browsing Histories," *ACM*, ICIS 2009, Nov. 24-26, 2009, Seoul, Korea, pp. 992-994.

\* cited by examiner

*Primary Examiner* — Marc Somers
(74) *Attorney, Agent, or Firm* — Blakely, Sokoloff, Taylor & Zafman LLP

(57) ABSTRACT

An automatic organization into topics for a browsing history. In one embodiment, a system identifies groups of browsing actions as related, and clusters the browsing history (e.g. a web browsing history) into sessions based on heuristics used to determine relationships. Latent semantic analysis can be used to determine the relationships which can be considered topics. User interfaces for displaying or otherwise presenting these sessions can include icons representative of topics, and these icons can have different sizes depending on a frequency of web page visits within a topic. The topics can be displayed in time ranges or in a cover flow view or both time ranges and cover flow view.

25 Claims, 13 Drawing Sheets

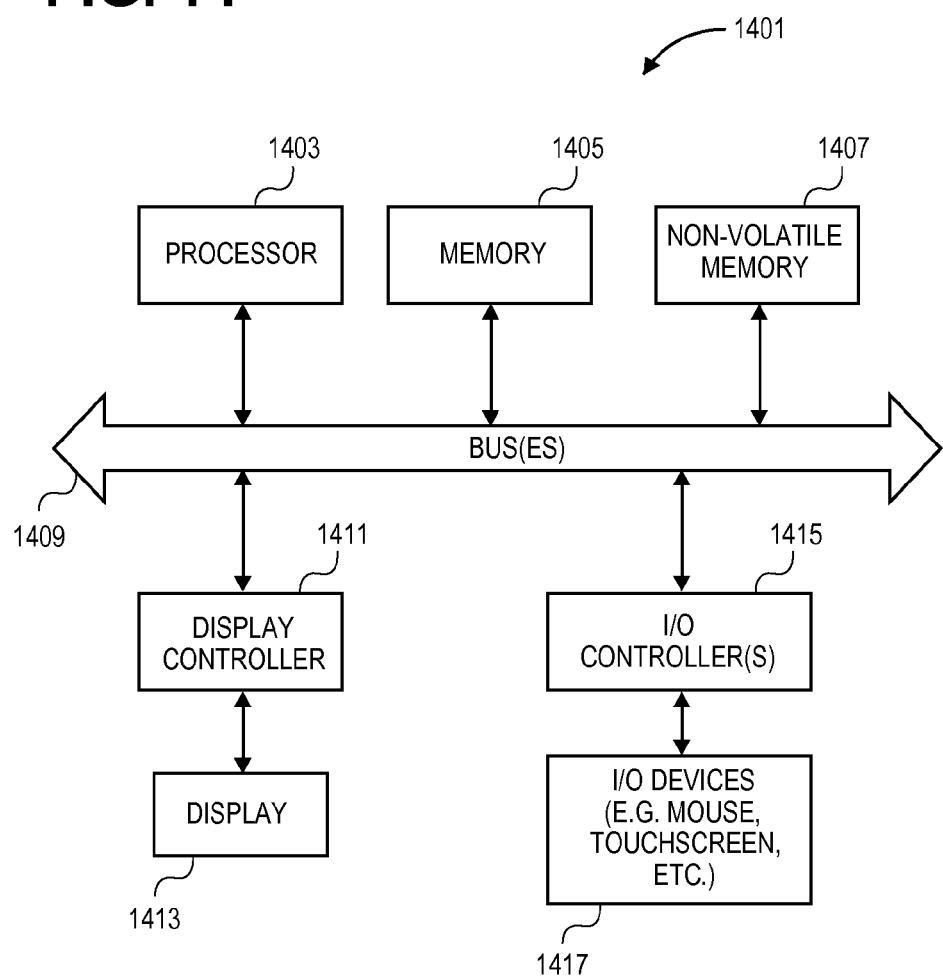

US 8,600,967 B2

AUTOMATIC ORGANIZATION OF BROWSING HISTORIES

BACKGROUND OF THE INVENTION

The Internet and particularly the world wide web (also known as merely the web) is a tremendous source of information for a variety of different topics (e.g. science, culture, politics, economics, psychology, law, industry, weather, etc.). Often, a user will browse the web looking for information about a given topic one day and will browse the web looking for information about another topic on another day. Over a period of time, a user can browse the Internet for a variety of topics which are not reflected in conventional browser histories. A conventional web browser, such as Safari from Apple Inc. of Cupertino, Calif. or Internet Explorer from Microsoft Corporation of Redmond, Wash., includes a history list that provides a linear temporal list of web pages visited without regard to the topics of those web pages. Hence, the history features of these web browsers cannot give a user a sense of the topics explored on the Internet.

The prior art describes techniques for organizing web pages visited based on categories or topics. For example, U.S. published application no. 2007/0220441 (inventors: Don Melton and Bas Ording) describes ways to organize a web page history into topics. U.S. patent application Ser. No. 11/724,880 filed Mar. 15, 2007 (inventors: Giovanni Donelli; Jerome Bellegarda; Steve Ko; and John Scalo) describes techniques for filtering web pages into categories based on the content of the web pages. Other prior art includes: US published application nos.: 2009/0204599; 2009/0006371; 2008/0200207; 2007/0162298; and 2006/0224583; also, non-patent prior art includes "Making Links Between Goal and Tasks to Retrieve Information from Web Browsing Histories," *ACM*, Nov. 24-26, 2009. While this prior art provides certain advantages by using topics to organize a web browser's history, it fails to provide numerous features, described in this disclosure, that facilitate practical uses of topics in a web browser's history presentation.

SUMMARY OF THE DESCRIPTION

Methods and systems that provide an automatic organization into topics for a browsing history are described. In one embodiment, a system identifies groups of browsing actions as related and clusters the browsing history into sessions based on heuristics used to determine relationships. Latent semantic analysis can be used to determine the relationships which can be considered topics. User interfaces for displaying or otherwise presenting these sessions can include icons representative of topics, and these icons can have different sizes depending upon a frequency of web page visits within a topic. The topics can be displayed in time ranges or in a cover flow view or both time ranges and cover flow view.

In one embodiment of a method according to the present invention, a request to conduct a search of the history of web pages visited can be received by the system which in response can display the search results in a topics view, with an indicator for each topic which indicates a frequency of visits within the topic. This indicator can be a number or can be the size of the representation of the topic (which can be an image of a representative web page within the topic). The size of the representative web page can vary depending upon the frequency of visits within the topic relative to the other topics shown in the search results. The method can further include receiving a selection of the time parameter and then displaying web pages using the time parameter as a filter such that web pages visited outside of the time parameter (which may be a time range) are not shown. A plurality of web pages within a topic may be represented by a single representative web page but other web pages within that topic may be displayed by a sweep of a cursor or stylus or finger across an area within the border of that page.

In another embodiment, a method of the present invention can include receiving a request to display a history of web pages visited in a topics view and displaying topics having web pages visited within a selected time range while other topics having no web pages visited within the selected time range are not displayed. Systems which can perform any one of these methods and machine readable storage media which can cause a system to perform any one of these methods are also described herein.

BRIEF DESCRIPTION OF THE DRAWINGS

The present invention is illustrated by way of example and not limitation in the figures of the accompanying drawings in which like references indicate similar elements.

FIG. 14 is an example of a data processing system which may be used with any embodiment described herein.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
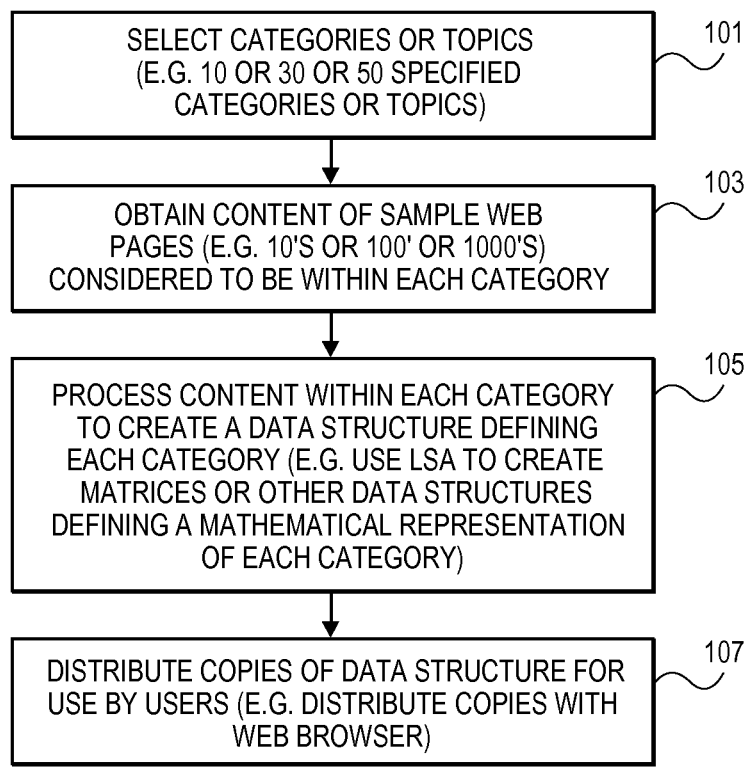
FIG. 1 shows a flow chart which presents a method according to one embodiment of the present invention.
Figure 4:
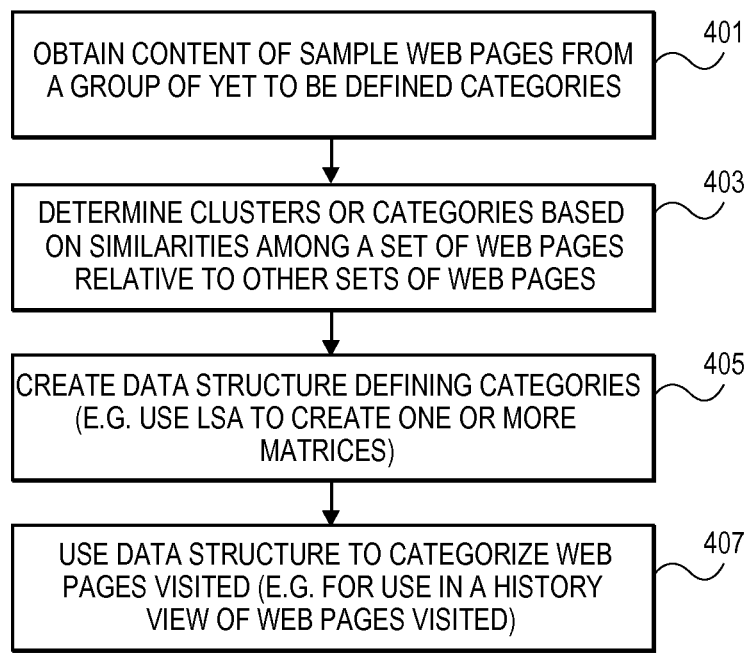
FIG. 4 is a flow chart which shows a method according to one embodiment of the present invention in which a data structure is created with no predefined topics.

A data structure for use in organizing a web browser's history according to topics can be constructed prior to a user's use of the web browser or as the user uses the web browser. In either case the data structure is "trained" based upon the content presented in the web browser. The training which creates the data structure may be based upon a predefined group of topics which are carefully selected prior to beginning training or the training process itself establishes the topics or categories through an auto-clustering process. FIG. 1 shows an example of a method in which a pre-selected group of topics is carefully developed prior to creating a data structure, and the data structure is created prior to a user's first use of the web browser. FIG. 4, in contrast, is an example of a method of creating the data structure without defining the categories at the beginning of the training process for creating the data structure.

The method shown in FIG. 1 can begin with the selection of categories or topics in operation 101. The number of topics selected can vary depending upon the implementation; in one embodiment, thirty pre-selected topics can be used. In operation 103, the content of sample web pages is then obtained for each of the topics. For example, if one of the topics is "sports" then a plurality of web pages judged to be directed to that topic (such as, for example, ESPN web pages or Sports Illustrated web pages, etc.) can be obtained. The number of web pages obtained in operation 103 within a topic may be as few as 10 or 20 or 30 web pages within a topic or as high as one or more thousands of web pages within a particular topic. This process will typically require some judgment in deciding whether a web page should be characterized as being within a topic, and it may be desirable to be conservative in the selection and judgment of web pages in operation 103. Then in operation 105, the method processes the content within all categories to create a data structure defining each category. In one implementation, latent semantic analysis (LSA) can be used to create matrices or other data structures defining a mathematical representation of each category. This can result in a cluster or a definition of a cluster in a cluster map, where each cluster represents a particular topic or category. Examples of the use of LSA to process web page content are described in U.S. application Ser. No. 11/724,880, filed on Mar. 15, 2007, which application is incorporated herein by reference. At this point, in operation 107, the data structure which defines the various categories can be distributed to users for use with their web browser. For example, the distribution may occur through a network (e.g. the Internet) or through the distribution of DVDs or CDs containing the web browser and the data structure. The distribution of the data structure allows a user to use any one of the methods described below in which a user can present a web history in a topics view such as, for example, the method shown in FIG. 3 or FIG. 5 or FIG. 6 or FIG. 13.

Figure 2:
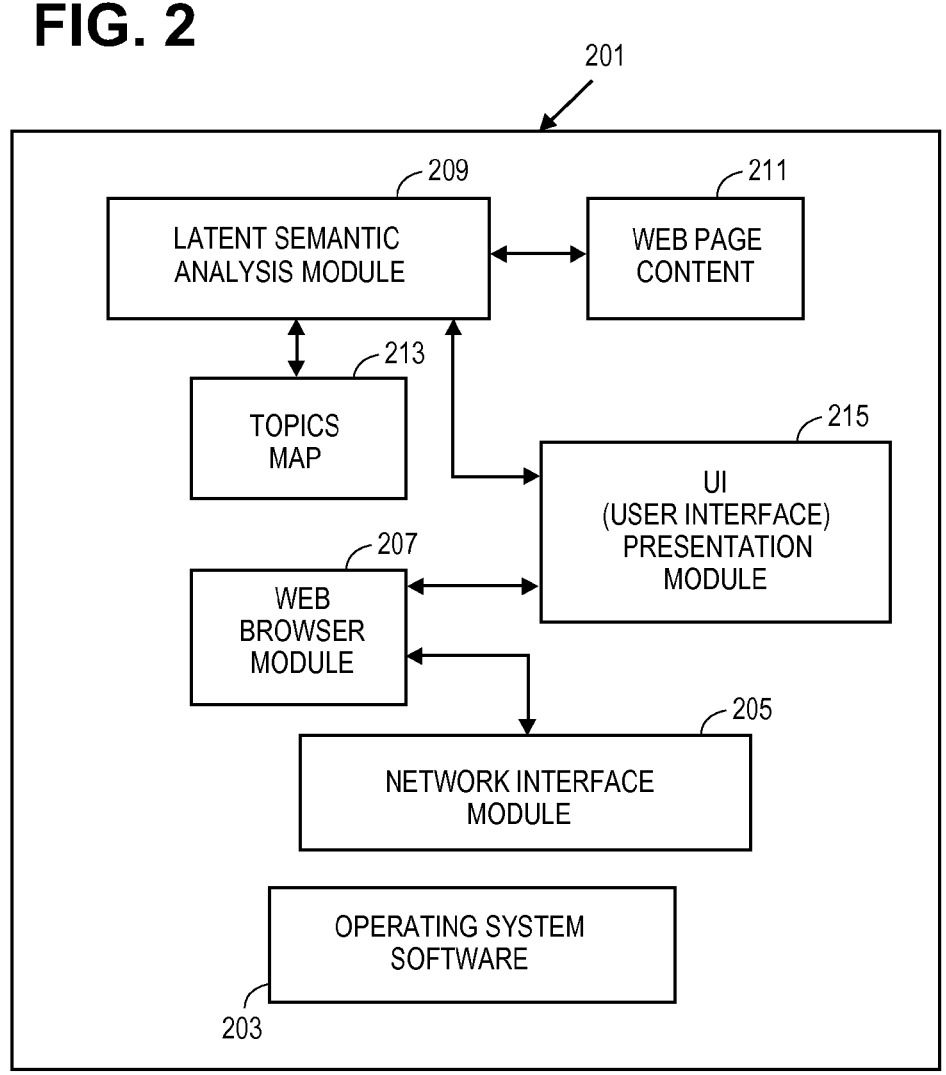
FIG. 2 shows an example of an architecture of an embodiment of the present invention which may be implemented in software.

FIG. 2 shows an architecture of a system for implementing any one of the embodiments described herein. A machine readable storage medium 201 can store a plurality of software components and data as shown in FIG. 2 to implement the system. The software may be stored on a single memory device or distributed across a plurality of memory devices including, for example, a hard disk drive, dynamic RAM or a combination of those. The memory may also include flash memory and other types of memory which are known in the art. Some or all of the components may be substituted with hardware acceleration and some or all of the components may be locally stored or remotely stored as is further described below. Medium 201 can include an operating system software 203 which may be conventional operating system software. The system can also include a network interface module 205 which can include software for providing a TCP/IP software stack to interact with the Internet as is known in the art. The web browser module 207 can be web browser software, such as software to implement a web browser such as the Safari web browser or the Internet Explorer web browser. The topics map 213 is a data structure which represents the topics or categories and which can be used to categorize new web pages being retrieved by a user through the web browser module 207. The topics map 213 can be, for example, the data structure created in operation 105 of FIG. 1 or the data structure created in operation 405 of FIG. 4 or a revised data structure created through a reassignment as in operation 511 of FIG. 5. The latent semantic analysis module 209 can be conventional LSA software which is used to process content in order to perform operation, for example, 105 of FIG. 1 or operation 303 of FIG. 3 or operation 405 of FIG. 4 or operation 505 of FIG. 5, for example. The LSA module may perform an analysis based upon the frequency of at least certain words within each of the web pages visited relative to a representation of the frequency of words in web pages used to create training data (such as the content obtained in operation 103) to establish the topics. The LSA module 209 uses content from the web page, such as content 211 in order to make a determination about how to characterize newly visited web pages relative to topics in the topics map 213. User interface presentation module 215 works in conjunction with LSA module 209 and the web browser module 207 to present any one of the user interfaces described herein, such as, for example, the user interface shown in FIG. 7, or FIG. 8, or FIGS. 9A-9C, or FIGS. 10, 11, 12A, and 12B.

Figure 3:
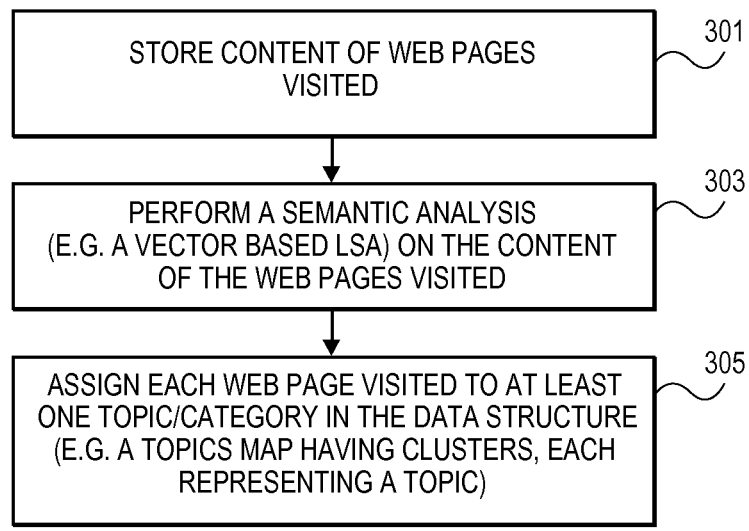
FIG. 3 is a flow chart which shows a method according to one embodiment of the present invention.

FIG. 3 provides a method of how the data structure developed, for example, in operation 105 and shown as the topics map 213, can be used after it is produced to allow a user to browse the Internet and then cause each of the web pages visited to be assigned to at least one topic in the data structure created in, for example, operation 105 or operation 405 or operation 511. The method shown in FIG. 3 can begin in operation 301 in which content of the web pages which have been visited by a user are stored at least temporarily. Then in operation 303, a latent semantic analysis or other types of semantic analysis can be performed on the content of the web pages visited. This content can be, for example, the content 211 stored on a machine readable storage medium as shown in FIG. 2. The analysis can be performed, for example, by the LSA module 209 as shown in FIG. 2. The result of this analysis allows each web page visited, as shown in operation 305, to be assigned to at least one topic or category in the data structure, such as the topics map 213. In one embodiment, the topics map may be considered to have clusters, each of which represents a topic in a multi-dimensional vector space described by the topics map. The assignment of each web page to a particular topic then allows the presentation of that web page as part of the topic within a topics view of the web browser's history as is described further below.

FIG. 4 shows a flow chart in which a data structure defining the categories or topics is created without predefining the categories or topics. This method may be used before using the data structure to categorize web pages or while web pages are being visited by a user during normal use of a web browser. The method shown in FIG. 4 may be considered an "auto-clustering" technique to develop the topics or categories based upon the web pages used. In one embodiment, the method can automatically determine a name for each topic. In operation 401, the method can obtain content of sample web pages from a group of yet-to-be-defined categories or topics. This sample, in one embodiment, can be a well-defined sample across a group of topics or categories or can be a sample of web pages obtained as a user browses the Internet beginning with an empty data set of sample web pages. In operation 403, the method determines clusters or categories based on similarities among a set of web pages relative to other sets of web pages using the content of the web pages. In one embodiment, an LSA method can be used to develop the clusters or categories, and then in operation 405 a data structure can be created defining the categories. Then in operation 407, the data structures can be used to categorize web pages visited by a user during normal use of a web browser.

Figure 5:
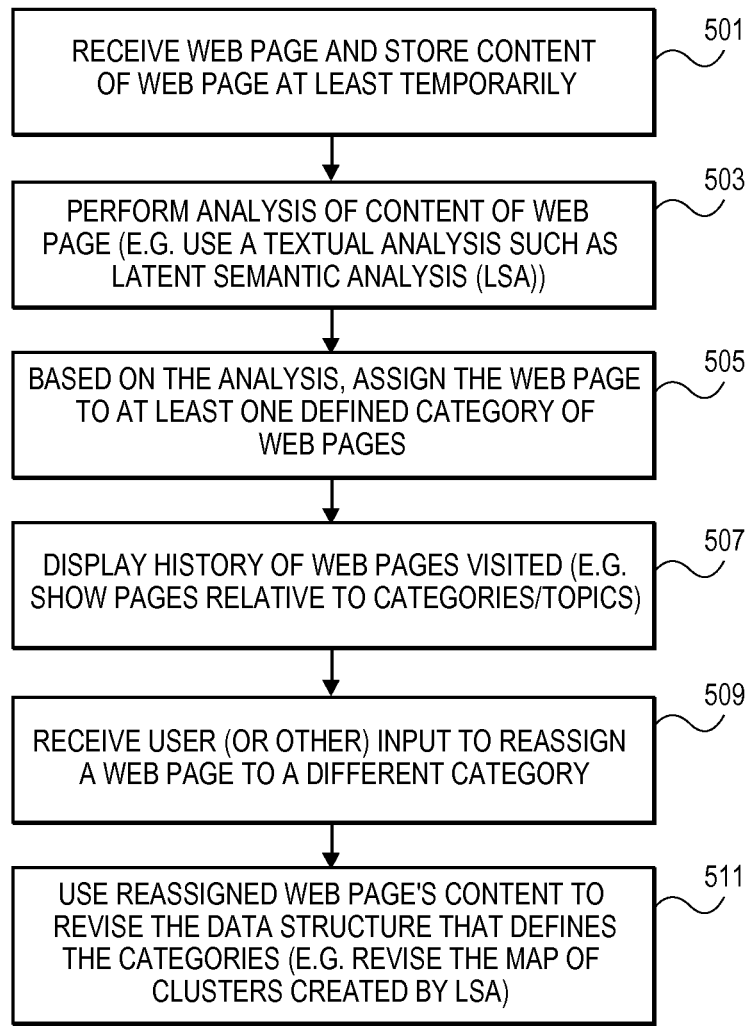
FIG. 5 shows a flow chart depicting an embodiment for revising the data structure that defines the categories or topics according to one embodiment of the invention.

The data structures created as part of training a model to develop a topics map, such as topics map 213, can be modified by a user according to at least certain embodiments of the present invention, including the embodiment shown in FIG. 5 which is a method for allowing a user to reassign a topic for a particular web page visited by the user to cause the data structure, such as the data structure developed in operation 105, to be revised to produce a different topics map, such as a different topics map relative to the topics map 213 shown in FIG. 2. In operation 501, the method receives a web page and stores the content of the web page at least temporarily. Then in operation 503, the system performs an analysis of content of the web page, such as a textual analysis using LSA. In operation 505, the method assigns the web page, based upon the analysis, to at least one defined category of web pages and the system can display, in operation 507, a history of web pages visited based upon the assignment of each web page to a particular topic. In at least certain embodiments, a method can allow a user to reassign a web page to a different category and this will in turn cause the system to, at some point in time, revise the data structure in order to change how the data structure is used in the future to categorize or assign web pages (as in operation 505) to one of the topics or categories defined by the data structure. The reassignment operation is shown as operation 509, and the revision of the data structure is shown as operation 511 which may employ the use of LSA to revise the data structure based upon the user's reassignment of a particular web page's content or a plurality of web page's content.

Figure 6:
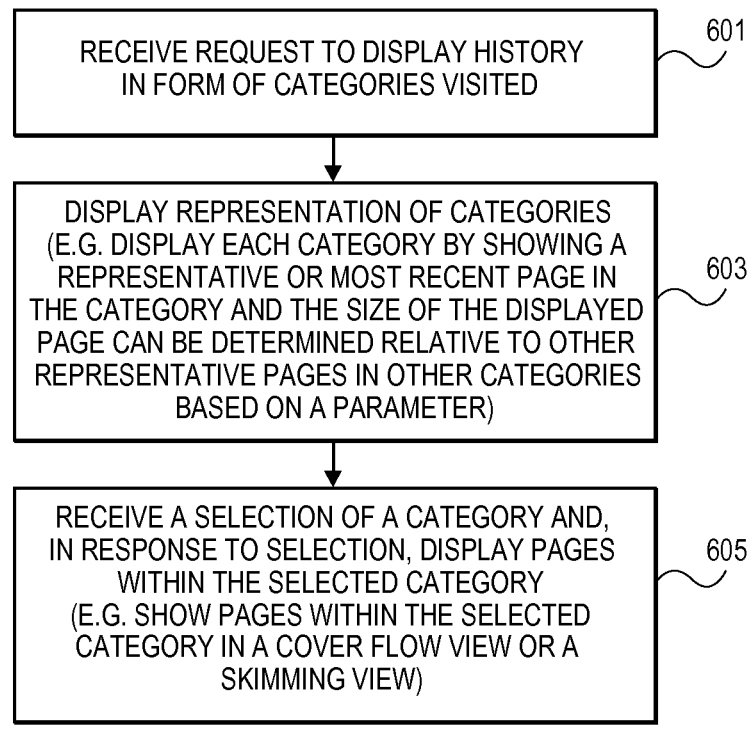
FIG. 6 illustrates a flow chart describing a user interface method according to one embodiment of the present invention.

Once a data structure defining categories or topics has been defined, as in operation 105 for example, and once one or more web pages has been assigned to at least one topic in that data structure, as in operation 503, then a method such as shown in FIG. 6 may be employed to provide a topics view of a web browser history. In operation 601, a data processing system can receive a request to display a history in the form of categories or topics visited. In response, the system can display a representation of categories in operation 603. For example, the system can display each category by showing a representative or most recent page in the category or topic. The size of the displayed page can be determined relative to other representative pages in other categories based on the parameter which may be a relative frequency of visiting that topic relative to another topic. For example, a topic which has been visited 20 times (e.g. 20 different web pages) relative to a topic visited 10 times could be displayed as twice as large through its representative page relative to the representative page of the other topic. This use of relative size is further described below (e.g. see FIG. 7). A user interface mechanism may be employed to allow a user to drill down within a particular category or topic in order to see pages within a selected category. For example, as shown in operation 605, the data processing system may receive a selection from a user of a category or topic and in response to the selection, display pages within the category. The pages may be displayed within a selected category by showing the pages within a cover flow view (see FIG. 10) or a skimming view such as the skimming view depicted in FIGS. 9A-9C.

Figure 7:
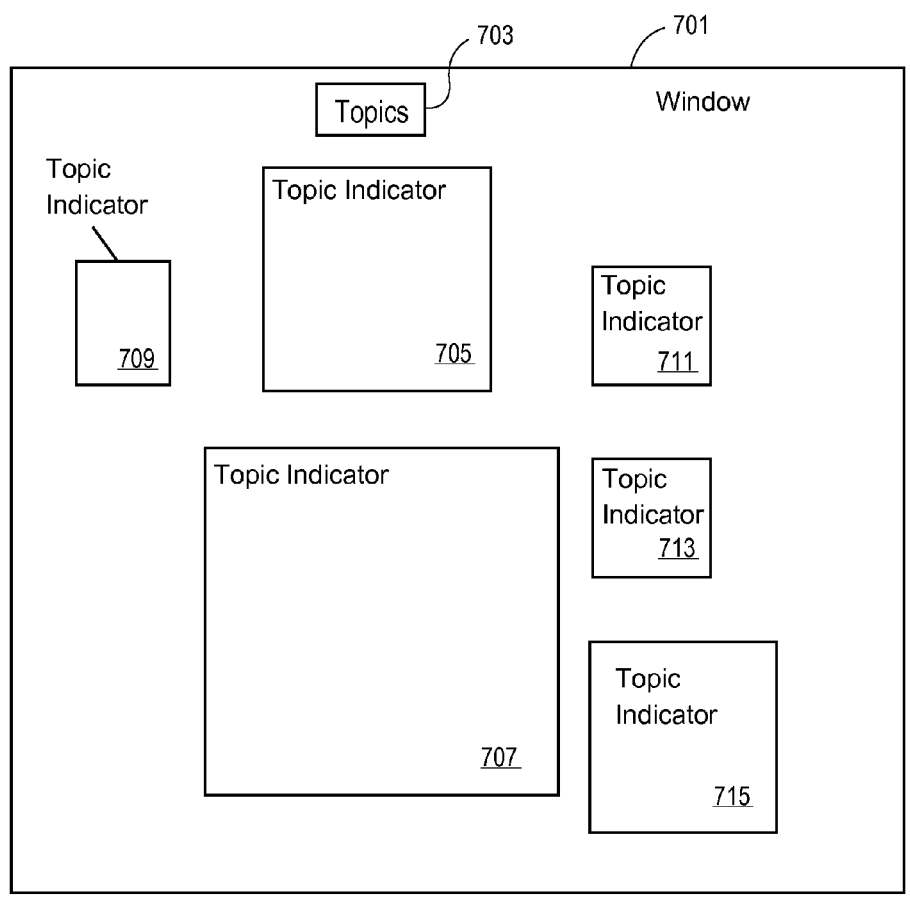
FIG. 7 shows an example of a user interface according to one embodiment of the present invention.

FIG. 7 shows an example of a user interface for displaying a topics view to a user. The window 701 includes a display of topics, each represented by a representative icon or web page for a topic in a topics view of a web browser history. The window 701 includes a topics indicator 703 which denotes that the window represents a topics view of the web browser history. The topics window 701 can present, in one embodiment, only those topics having web pages represented in the web browser's history. For example, if there are 30 topics which are available in a data structure defining the topics (e.g. the data structure defined and created in operation 105) then, in the case of FIG. 7, the window 701 shows only 6 of those 30 topics, which means that the user has not visited web sites which have been assigned to or categorized in any of the other 24 topics available within that data structure. A thumbnail of a representative web page within a particular topic may be used to show that topic or represent that topic within the window 701. The representative web page may be selected based upon frequency of visits within a particular topic or highest relevancy based upon a relevancy measure of a web page within a topic or other techniques known in the art. Alternatively, a generic static icon may be used to display a topic within the window 701. The different sizes of the representative web pages or other indicators of each topic can be based upon the frequency of visits to, or pages in, each of the topics. In one embodiment, the larger the representative web page or other indicator of a topic, then that topic has been visited, according to the web history, more often than other topics. The number of pages may be used as a measure of frequency or the number of visits to any page within a topic can be used as a measure of frequency or a combination (e.g. weighted combination) of the number of pages and the number of visits within a topic. In the example shown in FIG. 7, the topic represented by representative web page 707 has the most visits and has been visited more (or has more pages) than the topic represented by web page or representative web page 705. Similarly, the topic represented by representative web page 705 has been visited more often (or has more pages) than the topic represented by representative web page 715. Finally, the topic of representative web page 715 is visited more frequently (or has more pages), based upon the web page history, than the topic represented by representative web pages 711, 713, and 709. An algorithm may be employed to scale the sizes of the representative web pages in order to reflect the relative frequency of visits (or number of pages) between the different topics in order to provide the user with a sense of how much web browsing the user has done within each of the topics.

Figure 8:
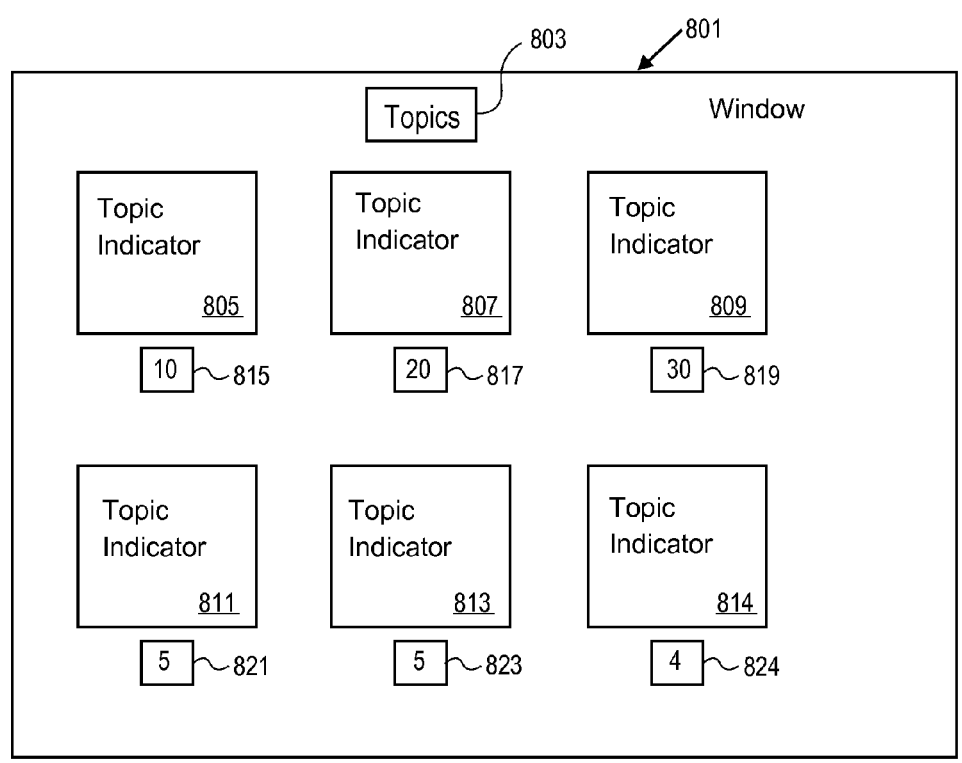
FIG. 8 shows another example of a user interface according to one embodiment of the present invention.
Figure 9A:
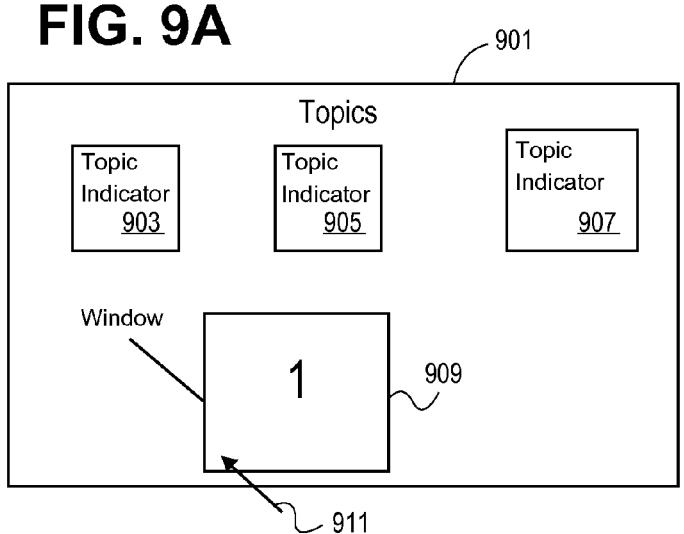
FIGS. 9A, 9B, and 9C show another example of a user interface according to an embodiment of the present invention.
Figure 9B:
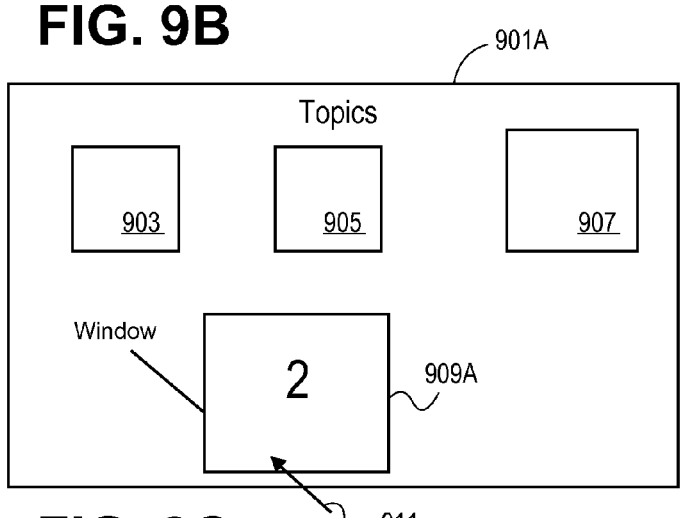
Figure 9C:
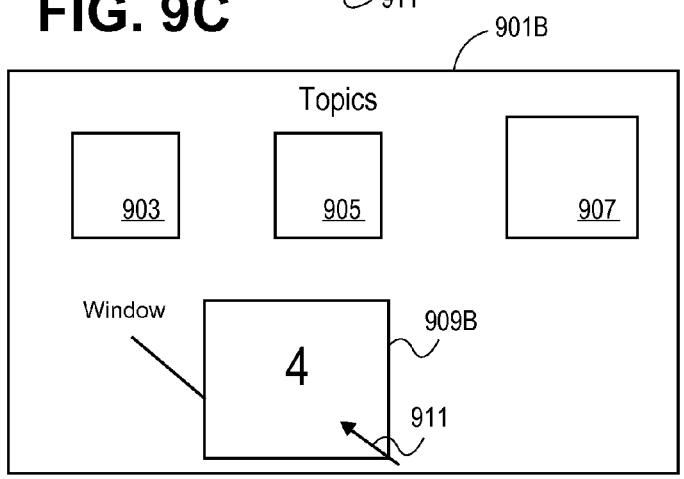

FIG. 8 shows an alternative user interface for a topics view of a web browser history. The window 801 includes a topics indicator 803 which indicates that the web browser history is shown in a topics view. Representative web pages or other indicia of particular topics are shown as pages 805, 807, 809, 811, 813, and 814. Below each of the representative pages is a number or other indicator 815, 817, 819, 821, 823, and 824, which indicates the frequency of visits or pages to each of the topics. It can be seen that the topic represented by page 809 is most frequently visited with 30 visits while the topic represented by web page 807 has been visited 20 times and the topic represented by web page 805 has been visited 10 times, etc. In one embodiment, the user may be able to switch between the user interface shown in FIG. 8 and the user interface shown in FIG. 7. In another embodiment, the user may be able to display generic, static icons showing topics which have been visited so that the user can see generic icons for the topics. The topics view shown in FIG. 7 or in FIG. 8 can show many web pages within a particular topic by employing a user interface as shown in FIGS. 9A-9C. Within the same border (which can have a fixed location within a window) of a representative web page, such as the representative web page 707, a user may skim across a representative web page to display several different web pages within the same topic. This functionality is similar to the skimming user interface in iPhoto from Apple Inc. of Cupertino, California.

An example of this skimming interface for a topics view is shown in FIGS. 9A, 9B, and 9C. A window 901 can show a topics view of a web browser's history. Each topic in the history shown within window 901 can be represented by a representative web page actually visited by the user or by a generic static representation, such as an icon for a particular topic. The generic static icon can be used at least initially before skimming across the icon to show each web page within a topic. The skimming interface may be used to show web pages in the entire web browser's history or to show web pages found in a search, described further below, of web pages visited (such as, for example, the search method described in conjunction with FIG. 13). In one embodiment, window 901 shows four representative web pages for four topics, and the size of each of those representative web pages is determined by the frequency of visits to a particular topic as explained above in connection with FIG. 7. For example, page 909 represents a particular topic which is visited more frequently than the other three topics, while page 907 represents a topic that is visited more frequently than the topics represented by pages 903 and 905. In one embodiment, the user can display each of the web pages within a particular topic by moving or sweeping or skimming a cursor, such as cursor 911, over an area of the page 905. In alternative embodiments, systems which use a touch screen or which do not display a cursor can allow an input to perform the same operation, such as a finger skimming across the area on a touch screen which displays page 909. The numeral 1 within page 909 represents the content of the first representative web page within the topic represented by page 909. As the user moves the cursor from left to right, the system will display other web pages within the topic as shown in FIGS. 9B and 9C within a border that can remain fixed within the window. It will be appreciated that other movements may also be used such as a diagonal movement or a right to left movement, etc. In the embodiment shown in FIGS. 9A, 9B, and 9C, it is assumed that the movement is from left to right as shown by the different positions of the cursor 911 within the three different windows 901, 901A, and 901B. As the cursor is moved from left to right, different web pages are displayed in series or sequence in order to allow, in one embodiment, the user to see all of the web pages within a particular topic. In the position of cursor 911 shown in FIG. 9B, the page 909A is displayed, and in the position of the cursor within window 901B, the page 909B is displayed within the topic. The user interface shown in FIGS. 9A, 9B, and 9C allow a user to see all of the topics in a particular web browser history, or as search results of a search through the web browser history and at the same time also be able to see each web page within a particular topic in the set of topics represented by, for example, the topics map 213 as described herein. Alternative presentations of web pages within a particular topic are described in conjunction with FIGS. 10 and 11.

Figure 10:
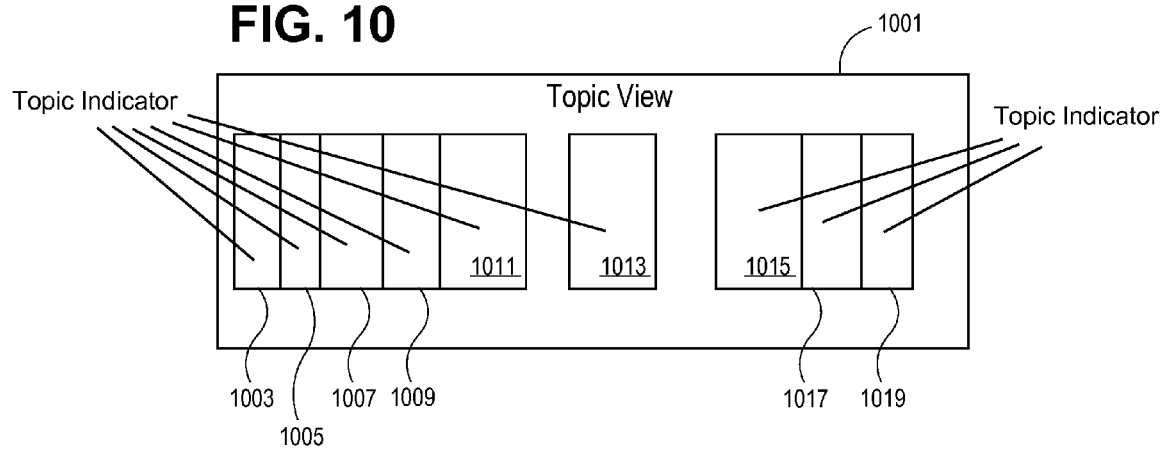
FIG. 10 shows an example of a user interface for providing a cover flow view in combination with a topic view.
Figure 11:
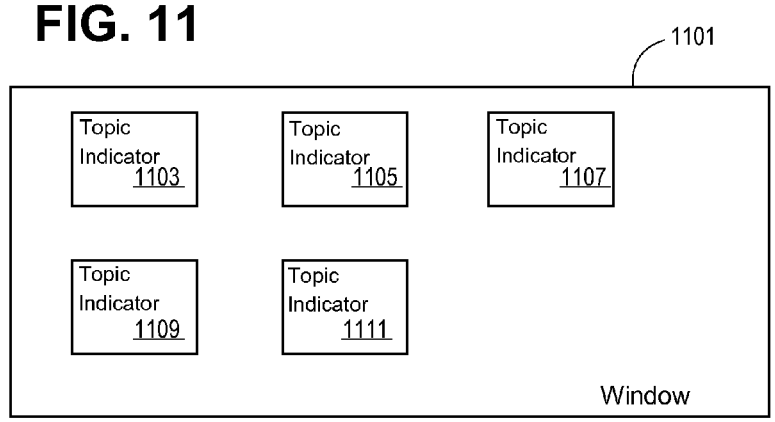
FIG. 11 shows an example of a user interface showing different web pages visited within a particular topic according to one embodiment of the present invention.

Web pages within a selected topic may be shown in a cover flow view, such as the example shown in FIG. 10, or in an icon view such as the example shown in FIG. 11. Window 1001 of FIG. 10 shows all of the web pages within a particular topic of a web browser's history or alternatively all of the web pages visited within a particular topic of the web browser's history that satisfy a search request, such as a search request described in conjunction with FIG. 13. The cover flow view as shown in FIG. 10 resembles the cover flow view which exists in iTunes media player application. A user can, using techniques known in the art, move the pages 1003, 1005, 1007, 1009, 1011, 1013, 1015, 1017, and 1019. As is known in the art, the pages can move from left to right and in reverse in response to user inputs, and one page, in this case page 1013, can be shown in isolation (e.g. by itself with no other page obscuring its content). Further details in connection with the cover flow view are described in pending U.S. application ser. No. 11/760,759 filed Jun. 9, 2007 by inventor Yan Arrouye, which application is incorporated herein by reference. It will be appreciated that the cover flow view of web pages within a topic, such as the user interface shown in FIG. 10, may be supplemented with an icon view of topics, such as the icon views of topics shown in FIG. 7 and FIG. 8; for example, the window 1001 could include an additional region juxtaposed with the window 1001 and that additional region could show the icon view of topics, such as the icon view of topics shown in FIG. 7 or the icon view of topics shown in FIG. 8. This would allow a user to see a representative web page (or generic static icon) for each topic in the web browser's history and also be able to see, through the cover flow view, all the web pages within a particular topic.

The icon view of web pages within a topic is shown in FIG. 11, and in particular pages 1103, 1105, 1107, 1109, and 1111 are web pages (e.g. thumbnails of the web pages) visited within a particular topic in the web browser's browsing history. In one embodiment, if too many web pages are presented within the icon view, the system may automatically use cover flow view. The icon view shown in FIG. 11 may be supplemented with an icon view of each of the topics within the web browser's history, such as the icon views shown in FIGS. 7 and 8, and thus supplementing may occur by including an additional window region above or below or on another side of the window 1101 to present the icon views of all topics within the web browser's history.

Figure 12A:
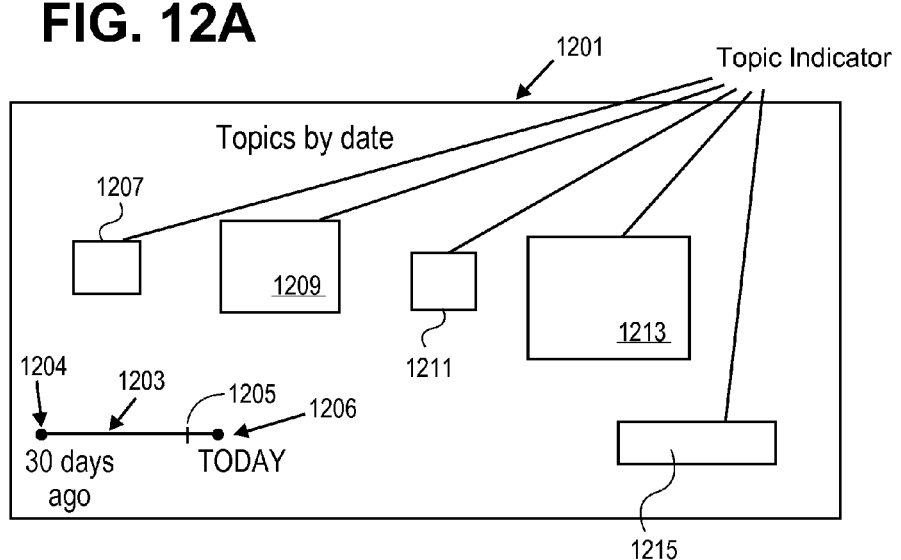
FIG. 12A shows a user interface for presenting topics by date according to one embodiment of the present invention.
Figure 12B:
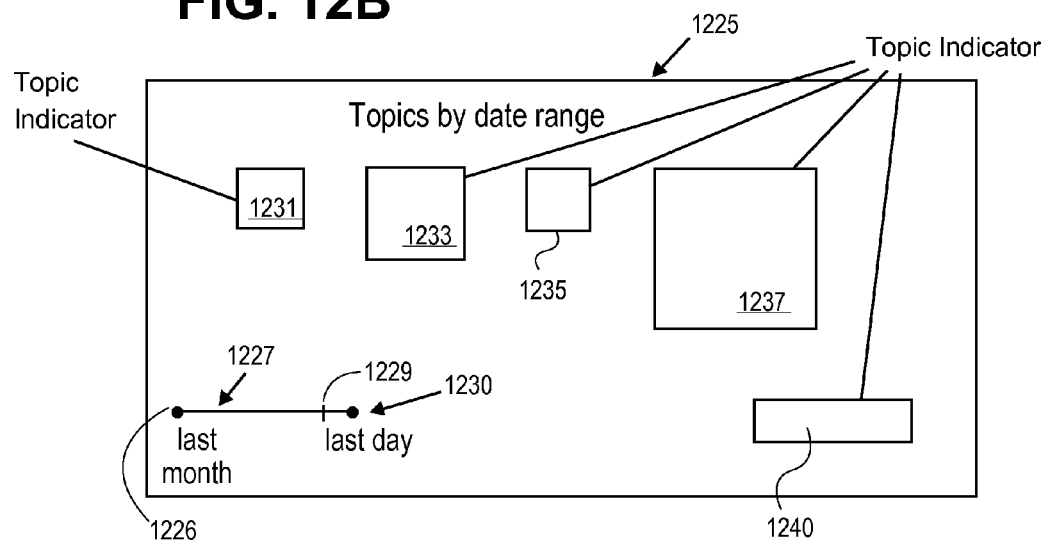
FIG. 12B shows a user interface for presenting topics by a date range according to another embodiment of the present invention.

The examples of the user interfaces shown in FIGS. 7 and 8 present the topics within a web browser's history for a particular user without regard to time. In certain embodiments, the presentation of topics within a web browser's history may be filtered based upon a time parameter such as a particular date (e.g. today or thirty days ago) or by a date range (within the last day, within the last week, within the last month, within the last year, etc.). Moreover, the presentation of topics within a web browser's history can include a search input field to allow the user to enter a search query such as text into the input field. FIGS. 12A and 12B provide examples of a user interface for a topics view which allows for filtering of the topics within a web browser's history by a time parameter such as date or date range. The window 1201 shown in FIG. 12A includes a search input field 1215 which allows a user to enter text in order to perform a search of the content of the web pages visited within the web browser's history. This content may be, for example, content 211 shown in FIG. 2 and described above. Pages 1207, 1209, 1211, and 1213 can be representative web pages within each of the four topics in the web browser's history presented within window 1201. The relative sizes of each of the representative pages is determined by the frequency of visits to (or number of pages in) each of the topics as described herein, such as the description in connection with FIG. 7 above. The window 1201 also includes a timeline 1203 and a moveable date selector 1205 which responds to user input which can move the date selector 1205 along the timeline between the end points 1204 and 1206. In the example shown in FIG. 12A, the end point 1206 represents today and the endpoint 1204 represents 30 days ago. By moving the date selector 1205 along the timeline 1203, the user can cause the system to filter the topics by date and hence to present the topics visited on each day within the 30-day period available along the timeline 1203. For example, if the user moves the date selector 1205 so that it is positioned on top of or right next to end point 1206, then representative web pages from the topics visited on today are displayed within window 1201. In the current location shown in FIG. 12A for the date selector 1205, the topics for web pages visited a few days ago (e.g. three days ago) are shown within the window 1201. If the user moves the date selector 1205 to line up with the end point 1204, then the user interface within window 1201 will show representative web pages of topics for web pages that were visited 30 days ago (and other topics of web pages not visited 30 days ago will not be displayed). A further filter may be provided by allowing the user to enter a search term within the search input field 1205 which will cause the system to search through the content of the web pages for a particular day selected by date selector 1205 and then to present representative web pages for each of the topics that satisfy the search input query (e.g. they contain the words or at least one of the words in the search input field 1215) and they also were visited on the particular day selected by date selector 1205. In this manner, a topics view can be filtered by both a content within a web page that matches the search query and by the date selected by date selector 1205.

The user interface shown in FIG. 12B presents topics by date range within the window 1225. Pages 1231, 1233, 1235, and 1237 can be representative web pages visited within each of the four topics, respectively, as shown in the window 1225. The sizes of each of the representative web pages can be determined by the relative frequency of visits to (or number of web pages in) each of the four topics as described above in connection with FIG. 7. The window 1225 can also include a search input field 1240 which can be similar to the search input field 1215 and provide the same functionality as the search input field 1215 as described herein. A range line 1227 can include end points 1226 and 1230 on the range line 1227 as shown in FIG. 12B. A range selector 1229, in one embodiment, can be moveable along the range line 1227 in response to user input, such as a cursor or touch input. Movement of the range selector 1229 allows the user to specify a particular date range to cause the system to then display topics having web pages visited within that date range but excluding other topics having web pages that were visited outside of that date range. In this manner, the topics can be filtered by a date range which may be within the last day, or within the last week (e.g. within the last seven days), or within the last month (e.g. within the last 30 days), etc. In the case of the user interface shown in FIG. 12B, a single moveable selector is used to specify a date range, but, in an alternative embodiment, two moveable selectors along a timeline or range line can be used to select a date range. For example, in this alternative embodiment a time range selector can have two selectors, one on the left (to select the least recent time limit to display) and one on the right (to select the most recent time limit to display), and both could be moved independently (as long as each of the left and right selectors do not move past each other).

Each of the user interfaces shown in FIGS. 12A and 12B may utilize a skimming view as described in conjunction with FIGS. 9A, 9B, and 9C, for example, and this skimming view will allow a user to see each of the web pages within a particular topic represented by the representative page, such as page 1207 or page 1231. Moreover, in certain embodiments, the user interfaces of FIG. 12A or 12B can allow a user to select a topic by selecting the representative web page and in response to that selection present either a cover flow view of all of the web pages within the selected topic (such as the cover flow view shown in FIG. 10) or the selection by the user of a particular topic can cause the presentation of an icon view of web pages within a topic, such as the icon view shown in FIG. 11.

Figure 13:
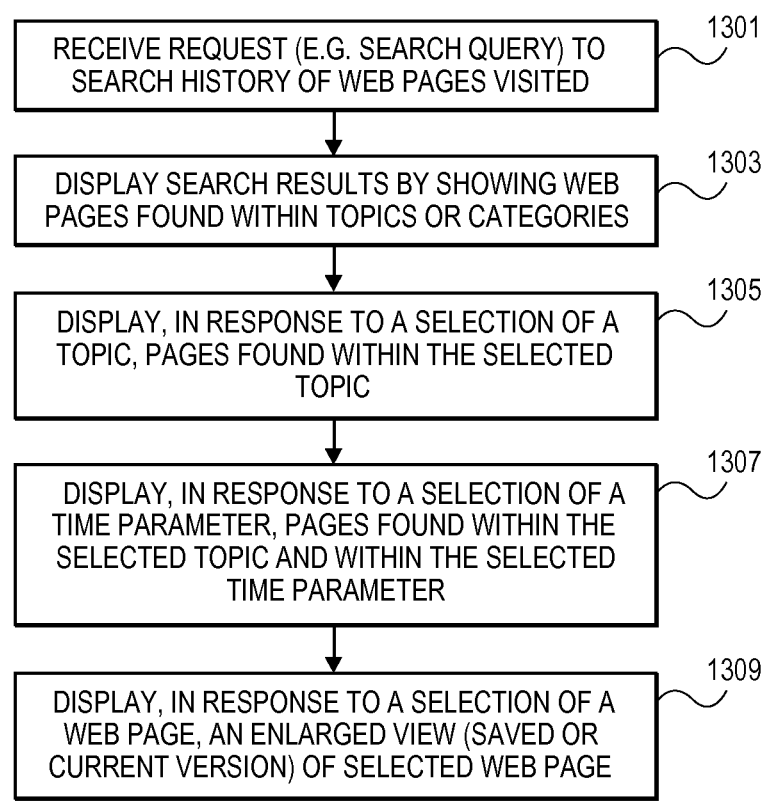
FIG. 13 is a flow chart which illustrates the use of topics view to present search results within a web browser's history.

The ability to search web page content and present the results of the search of web page content in a topics view can be provided by the method shown in FIG. 13. In operation 1301, the system receives a request, such as a search query, to search the history of web pages visited. This history can be metadata such as the URL and other metadata information of web pages visited or the full text content of the text within the web page, which content can be stored as content 211 as described above or both the metadata and the full text content. This content can be indexed in an inverted index database of the full text of the content of each web page visited and the search can be through that full text content in the inverted index database. In operation 1303 the results of the search can be presented by showing web pages found within topics or categories, and this presentation may be similar to the user interfaces shown in FIG. 12A or 12B or FIG. 7 or FIG. 8 or FIGS. 9A-9C, etc. In operation 1305 the system can display, in response to a selection of a topic, pages found within the selected topic. For example, a user can select a particular topic, such as the topic represented by page 1209 in FIG. 12A and in response to the selection the system can display the pages that match the search request within the selected topic. The presentation of the pages may be through the use of a skimming view or a cover flow view or an icon view. In operation 1307, the system can display, in response to a selection of a time parameter, the pages found within the selected topic and also within the selected time parameter which also satisfy the search results. In this instance, operation 1307 can filter the web browser's history based upon time, the particular topic and the content within a web page which matches the search query entered into, for example, a search input field, such as the search input fields 1215 or 1240. Then in operation 1309, the system can display, in response to a selection of a web page within a view presented of web pages, an enlarged view of a selected web page. This enlarged view may be a saved view or the current version of the web page.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 14 shows one example of a typical data processing system which may be used with the present invention. Note that while FIG. 14 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 14 may also be used with the present invention. The data processing system of FIG. 14 may be a Macintosh computer from Apple Inc. of Cupertino, Calif. As shown in FIG. 14, the data processing system 1401 includes one or more buses 1409 which serve to interconnect the various components of the system. One or more processors 1403 are coupled to the one or more buses 1409 as is known in the art. Memory 1405 may be DRAM or non-volatile RAM or may be flash memory or other types of memory. This memory is coupled to the one or more buses 1409 using techniques known in the art. The data processing system 1401 can also include non-volatile memory 1407 which may be a hard disk drive or a flash memory or a magnetic optical drive or magnetic memory or an optical drive or other types of memory systems which maintain data even after power is removed from the system. The non-volatile memory 1407 and the memory 1405 are both coupled to the one or more buses 1409 using known interfaces and connection techniques. A display controller 1411 is coupled to the one or more buses 1409 in order to receive display data to be displayed on a display device 1413 which can display any one of the user interface features or embodiments described herein. The display device 1413 can include an integrated touch input to provide a touch screen. The data processing system 1401 can also include one or more input/output (I/O) controllers 1415 which provide interfaces for one or more I/O devices, such as one or more mice, touch screens, touch pads, joysticks, and other input devices including those known in the art and output devices (e.g. speakers). The input/output devices 1417 are coupled through one or more I/O controllers 1415 as is known in the art. While FIG. 14 shows that the non-volatile memory 1407 and the memory 1405 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 1409 may include one or more bridges or controllers or adapters to interconnect between various buses. In one embodiment, the I/O controller 1415 includes a USB adapter for controlling USB peripherals and can control an Ethernet port or a wireless transceiver or combination of wireless transceivers. It will be apparent from this description that aspects of the present invention may be embodied, at least in part, in software. That is, the techniques may be carried out in a data processing system in response to its processor executing a sequence of instructions contained in a memory such as the memory 1405 or the non-volatile memory 1407 or a combination of such memories which together may embody the machine readable storage medium shown in FIG. 2. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable storage medium storing executable program instructions which when executed by a data processing system cause the data processing system to perform a method comprising:
    receiving a request to search a history of web pages visited within topics;
    displaying on a display device, in response to the request, a topics view indicator and search results, wherein the topics view indicator denotes the displaying is in a topics view, wherein the search results comprise topic indicators indicating only those topics visited in the history, wherein a topic indicator comprises a continuously displayed single thumbnail image of a representative web page visited within a topic, and wherein the topic indicator indicates a frequency of visits within the topic and wherein a size of the continuously displayed single thumbnail image indicates the frequency of visits and number of web pages visited within the topic.

2. The medium as in claim 1 wherein a size of the topic indicator indicates the frequency of visits within the topic and wherein the method further comprises:
    receiving a selection of a time parameter;
    displaying web pages matching the time parameter and found in the search results.

3. The medium as in claim 1, wherein the topic indicator further comprises a number positioned adjacent to the continuously displayed single thumbnail image, wherein the number indicates the frequency of visits within the topic.

4. The medium as in claim 1 wherein the method further comprises:
    receiving an input to display a series of web pages visited within the topic, the series being displayed over time in a border in a fixed location.

5. The medium as in claim 4 wherein the input includes a sweep of one of a cursor or a stylus or a finger across an area within the border.

6. The medium as in claim 1 wherein the method further comprises:
    receiving an input of a selection of the topic;
    displaying, in response to the input, web pages visited in the topic, the web pages being displayed in a cover flow view.

7. The medium as in claim 1, wherein the topics are selected and determined prior to visiting the web pages and wherein each of the web pages visited are categorized into one of the topics based upon an analysis of frequency of words within each of the web pages visited relative to a representation of the frequency of words in web pages used to create training data to establish the topics.

8. The medium as in claim 6 wherein a second topic indicator is displayed concurrently with the cover flow view of web pages in the topic.

9. A machine readable storage medium storing executable program instructions which when executed by a data processing system cause the data processing system to perform a method comprising:
- receiving a request to display a history of web pages visited in a topics view which displays topics based upon an analysis of content of web pages within topics;
- displaying, on a display device, a topics view indicator and topic indicators indicating topics, wherein the topics view indicator denotes the displaying in the topics view, and wherein the topic indicators each comprise a continuously displayed single thumbnail image of a representative web page visited in the indicated topics, the topic indicators having different displayed sizes, wherein a size of a topic indicator, on the display device, indicates a frequency of visits within a topic indicated by the topic indicator and wherein a size of the continuously displayed single thumbnail image indicates the frequency of visits and number of web pages visited within the topic.

10. The medium as in claim 9 wherein the method further comprises:
- receiving a selection of a time range;
- displaying topic indicators indicating topics having web pages visited within the time range while other topic indicators indicating topics having no web pages visited within the time range are not displayed.

11. The medium as in claim 10, wherein the method further comprises:
- receiving a selection of a topic to establish a selected topic;
- displaying web pages visited within the time range and within the selected topic while other web pages visited within the selected topic are not displayed.

12. A machine readable storage medium storing executable program instructions which when executed by a data processing system cause the data processing system to perform a method comprising:
- receiving a request to display a history of web pages visited in a topics view which displays topics based upon an analysis of content of web pages within a topic;
- displaying, on a display device, a topic view indicator and topic indicators, wherein the topic view indicator denotes the displaying in the topics view, and wherein the topic indicators indicate both topics having web pages visited within a selected time range and a frequency of visits within the topics within the selected time range while other topic indicators indicating topics having no web pages visited within the selected time range are not displayed, wherein a topic indicator comprises a continuously displayed single thumbnail image of a representative web page visited within a topic and wherein a size of the continuously displayed single thumbnail image indicates the frequency of visits and number of web pages visited within the topic.

13. The medium as in claim 12 wherein the selected time range is one of a default time range or a user selected time range.

14. A machine implemented method comprising:
- receiving a request to search a history of web pages visited within topics;
- displaying on a display device, in response to the request, a topics view indicator and search results, wherein the topics view indicator denotes the displaying in a topics view, wherein the search results comprise topic indicators indicating only those topics visited in the history, wherein a topic indicator comprises a continuously displayed single thumbnail image of a representative web page visited within a topic, and wherein the topic indicator indicates a frequency of visits within the topic and wherein a size of the continuously displayed single thumbnail image indicates the frequency of visits and number of web pages visited within the topic.

15. The method as in claim 14 wherein a size of the topic indicator indicates the frequency of visits within the topic and wherein the method further comprises:
- receiving a selection of a time parameter;
- displaying web pages matching the time parameter and found in the search results.

16. The method as in claim 14 wherein the method further comprises:
- receiving an input to display a series of web pages visited within the topic, the series being displayed over time in a border in a fixed location.

17. The method as in claim 16 wherein the input includes a sweep of one of a cursor or a stylus or a finger across an area within the border.

18. The method as in claim 14 wherein the method further comprises:
- receiving an input of a selection of the topic;
- displaying, in response to the input, web pages visited in the topic, the web pages being displayed in a cover flow view.

19. The method as in claim 14, wherein the topics are selected and determined prior to visiting the web pages and wherein each of the web pages visited are categorized into one of the topics based upon an analysis of frequency of words within each of the web pages visited relative to a representation of the frequency of words in web pages used to create training data to establish the topics.

20. The method as in claim 18 wherein a second topic indicator is displayed concurrently with the cover flow view of web pages in the topic.

21. A machine implemented method comprising:
- receiving a request to display a history of web pages visited in a topics view which displays topics based upon an analysis of content of web pages within topics;
- displaying, on a display device, a topics view indicator and topic indicators indicating topics, wherein the topics view indicator denotes the displaying in the topics view, and wherein the topic indicators each comprise a continuously displayed single thumbnail image of a representative web page visited in the indicated topics, the topic indicators having different displayed sizes, wherein a size of a topic indicator, on the display device, indicates a frequency of visits within a topic and wherein a size of the continuously displayed single thumbnail image indicates the frequency of visits and number of web pages visited within the topic.

22. The method as in claim 21 wherein the method further comprises:
- receiving a selection of a time range;
- displaying topic indicators indicating topics having web pages visited within the time range while other topic indicators indicating topics having no web pages visited within the time range are not displayed.

23. The method as in claim 22, wherein the method further comprises:
- receiving a selection of a topic to establish a selected topic;
- displaying web pages visited within the time range and within the selected topic while other web pages visited within the selected topic are not displayed.

24. A machine implemented method comprising:

receiving a request to display a history of web pages visited in a topics view which displays topics based upon an analysis of content of web pages within topics;

displaying, on a display device, a topic view indicator and topic indicators, wherein the topic view indicator denotes the displaying in the topics view, and wherein the topic indicators indicate both topics having web pages visited within a selected time range and a frequency of visits within the topics within the selected time range while other topic indicators indicating topics having no web pages visited within the selected time range are not displayed, wherein a topic indicator comprises a continuously displayed single thumbnail image of a representative web page visited within a topic and wherein a size of the continuously displayed single thumbnail image indicates the frequency of visits and number of web pages visited within the topic.

25. The method as in claim 24 wherein the selected time range is one of a default time range or a user selected time range.

\* \* \* \* \*